United States Patent [19]
Burgiss

[11] 3,994,014
[45] Nov. 23, 1976

[54] CIRCUIT FOR REWRITING BLOCKS OF PHASE ENCODED DATA

[75] Inventor: Samuel G. Burgiss, Raleigh, N.C.

[73] Assignee: Corning Glass Works, Corning, N.Y.

[22] Filed: Dec. 10, 1975

[21] Appl. No.: 639,222

[52] U.S. Cl. ................................. 360/42; 360/50
[51] Int. Cl.² ....................................... G11B 5/09
[58] Field of Search ................... 360/39, 40, 42, 50

[56] References Cited
UNITED STATES PATENTS

| | | | |
|---|---|---|---|
| 3,710,358 | 1/1973 | Gindi | 360/26 |
| R28,265 | 12/1974 | Irwin | 360/50 |

*Primary Examiner*—Vincent P. Canney
*Attorney, Agent, or Firm*—William J. Simmons, Jr.; Walter S. Zebrowski; Clarence R. Patty, Jr.

[57] ABSTRACT

A system wherein a magnetic tape is divided into a plurality of data storage blocks, each of which is preceded by a unique block marker. A phase encoder and phase decoder associated with the read/write head are connected by a data control circuit to a computer. As the head scans the block marker, the phase decoder supplies the computer with the block marker data via the data control circuit. Immediately after a predetermined block marker has been read, the computer provides the data control circuit with a write-signal and makes available a byte of parallel data to be written on the tape. The data control circuit includes an erase latch activated by the ongoing transition of the write-signal for providing the phase encoder with an erase-signal which causes the first byte on the magnetic tape following the block marker to be an erased gap. Thus, during the read mode, the phase decoder will encounter this byte of erased tape after the block marker has been read to permit the phase decoder to become synchronized with respect to the stored data.

3 Claims, 14 Drawing Figures

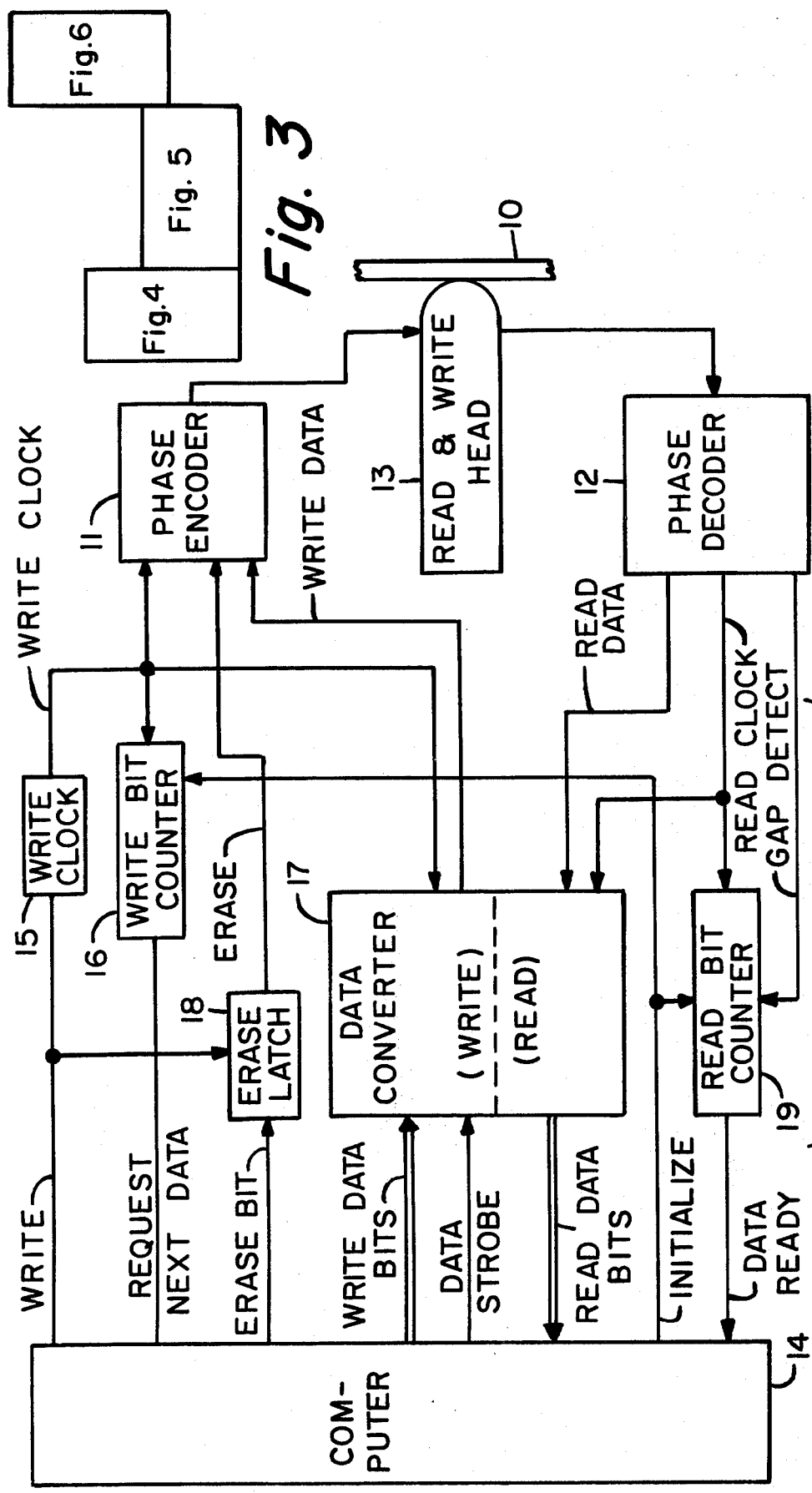

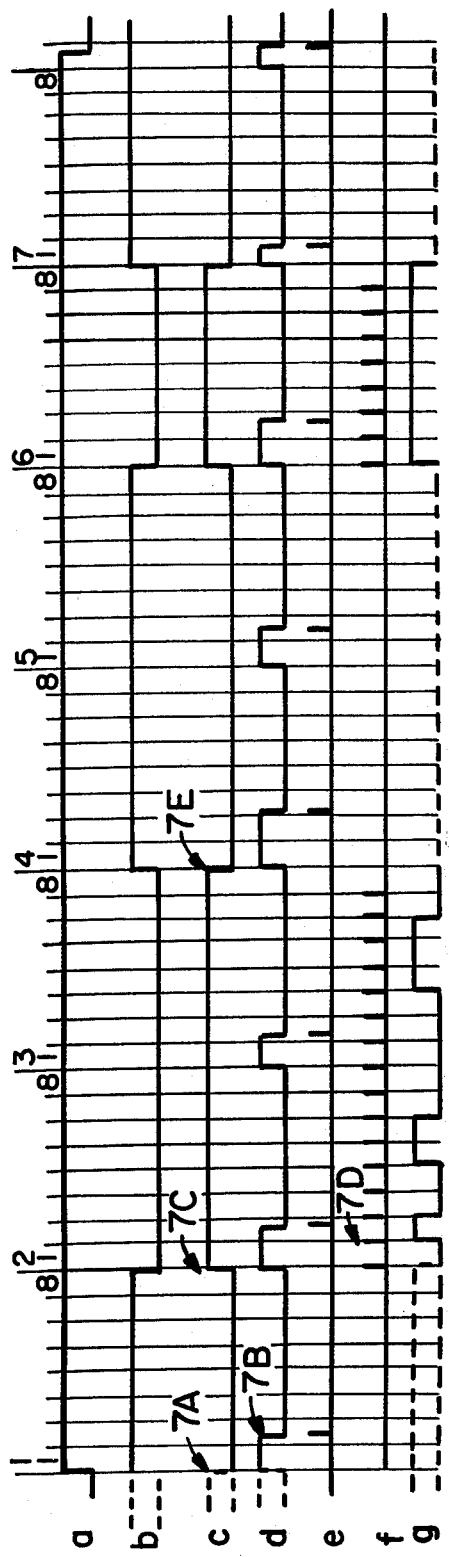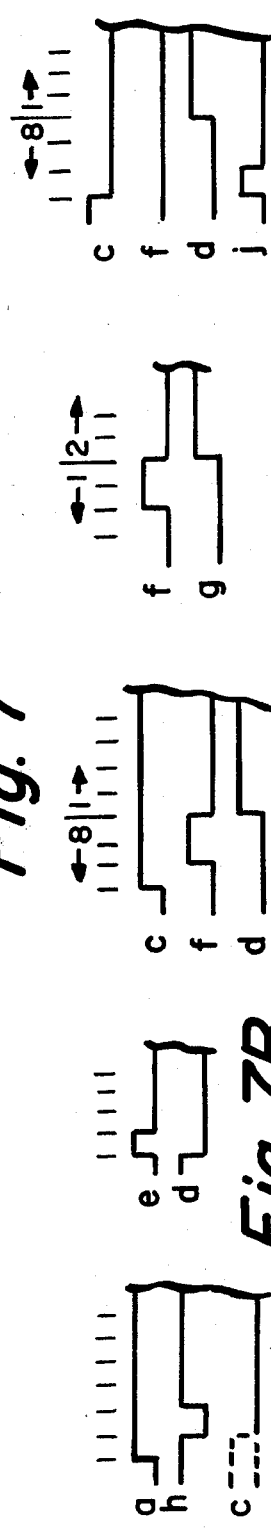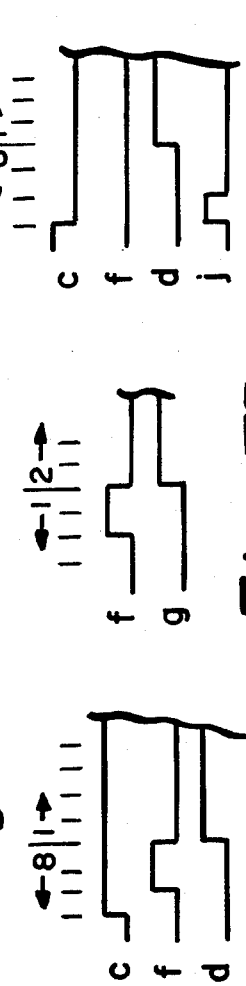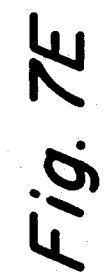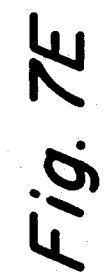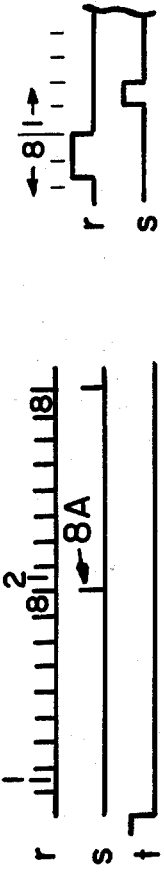

CIRCUIT FOR REWRITING BLOCKS OF PHASE ENCODED DATA

BACKGROUND OF THE INVENTION

The present invention relates to a system for accurately positioning blocks of digital data on a magnetic medium so that these blocks can be rewritten successive times without interferring with adjacent blocks, the recording method employed being phase encoding on a single track containing both the data and the format information.

In recording digital data on a moving magnetic medium such as a tape, disc, drum or the like, it is often necessary to re-record blocks or segments of the medium without interferring with adjacent blocks. This is accomplished by accurately positioning the block on the medium by reading a previously recorded timing or format track during the write or record operation. In those systems wherein a single track is employed for the data and the format information, the format is read to ascertain that the correct block is adjacent thereto. The system then shifts into the write mode and data is written in the block. Thus, the newly written block and the previously written format information adjacent thereto have been written at different times. In systems wherein the phase encoding method is employed, the data and the format information can therefore be out of phase. When the system is in the read mode, the phase encoder will properly set up following the interrecord gap and will correctly read the block marker. However, if the stored data adjacent to the block marker is out of phase therewith, that data cannot be detected by the phase decoder. Thus, in systems employing the phase encoding method of recording, wherein data was stored on one track, a separate track was required for the format information.

SUMMARY OF THE INVENTION

The circuit of the present invention is utilized in systems for storing phase encoded digital data on a magnetic medium. Such systems generally comprise read-write means for writing data on the medium and for reading data from the medium. A phase encoder receives binary coded digital data and provides the read-write means with a phase encoded signal. The phase encoder has an erase input terminal for receiving an erase signal which causes the read-write means to erase the magnetic medium. A phase decoder receives a phase encoded signal from the read-write means and provides a binary coded digital signal. A data source and sink provides write data bits which are to be written on the magnetic medium and also provides a write-signal which signifies the beginning of a write mode. The system also comprises means for transferring the write data bits to the phase encoder and for transferring the read data from the phase decoder to the data source and sink.

The data control circuit of the present invention is characterized in that it comprises an erase latch having an output terminal connected to the erase terminal of the phase encoder and an input terminal for receiving the write-signal from the data source and sink. The erase latch provides the phase encoder with an erase signal which causes erasure of the magnetic medium for a predetermined period of time following the ongoing transition of a write-signal.

BRIEF DESCRIPTION OF THE DRAWINGS

FIG. 1 is a schematic illustration of a magnetic tape on which the system of the present invention has recorded phase encoded data on the same track on which the format information is recorded.

FIG. 2 is a block diagram of the system of the present invention.

FIG. 3 illustrates the proper disposition of the drawings of FIGS. 4, 5 and 6 which contain a detailed schematic circuit diagram of the data control circuit of the present invention.

FIG. 7 illustrates various waveforms occuring in the operation of the system illustrated in FIG. 2 and in FIGS. 4–6 in the write mode.

FIGS. 7A through 7E illustrate in greater detail various waveforms of FIG. 7.

FIG. 8 illustrates various waveforms occurring in the operation of the system of FIG. 2 and FIGS. 4–6 in the read mode.

FIG. 8A illustrates in greater detail a portion of the waveforms of FIG. 8.

To appreciate the relationship between the detailed waveforms and those of FIGS. 7 and 8, the time per division will be set forth for each of these Figures for a typical example of operation of the system of the present invention. In FIGS. 7 and 8, each division is one bit time or 64 $\mu$s. In FIGS. 7A and 8A, each division represents 4 $\mu$s. In FIG. 7B, each division represents 200 ns. Finally, each division in FIGS. 7C, 7D and 7E represents 2 $\mu$s.

DETAILED DESCRIPTION

Figure 4:
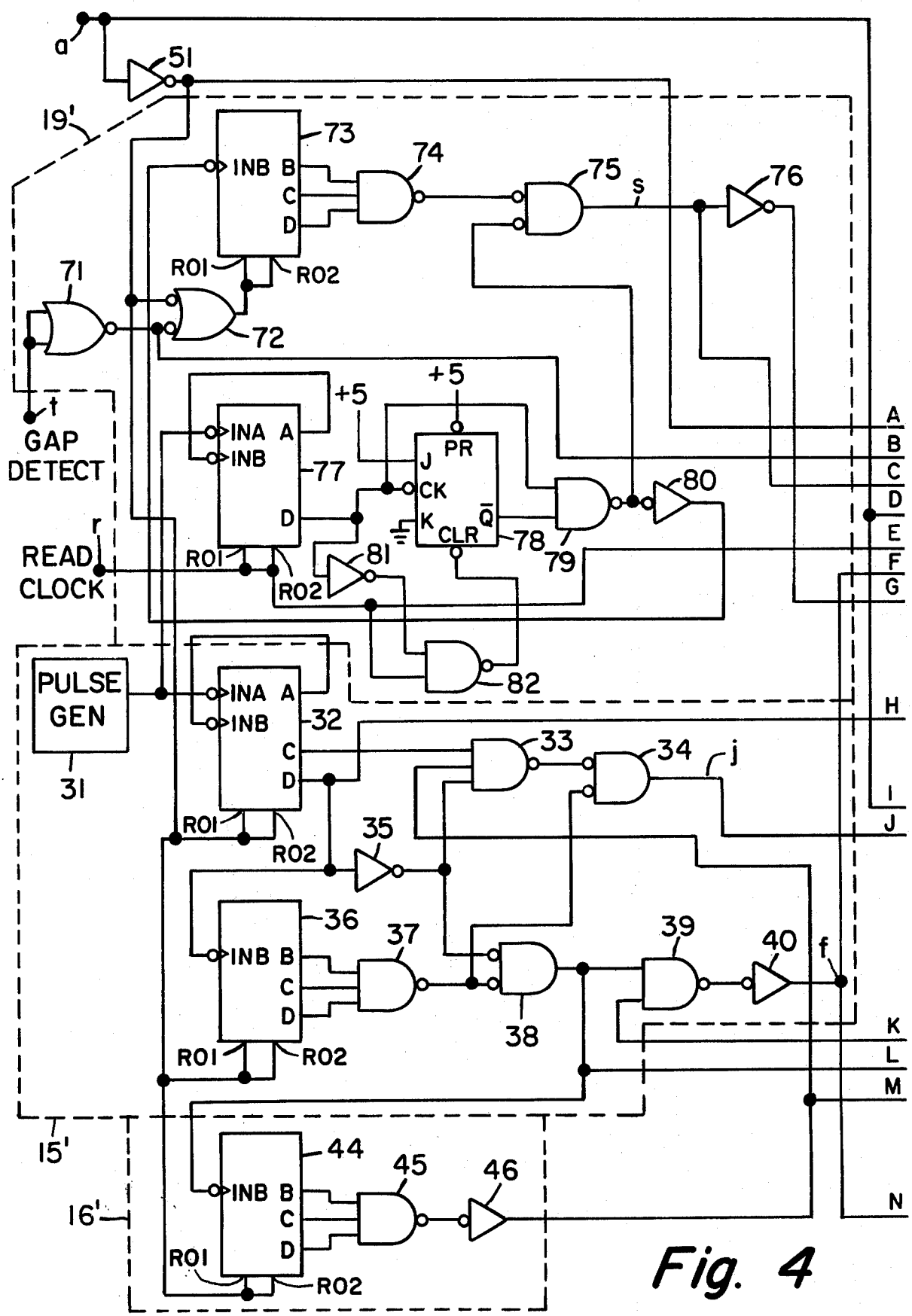

The accurate positioning of blocks of recorded data on a magnetic medium such as the magnetic tape illustrated in FIG. 1 requires that permanent block markers be written on the medium and that written blocks of data be accurately positioned with respect to these block markers. In accordance with the present invention this is accomplished with the format illustrated in FIG. 1. A block may be written for example, by starting the mechanical drive of the system while the read/write head is disposed over section A of erased tape which is the interblock gap. Full speed is obtained before section B reaches the head. Sections B, C and D constitute the block marker, section B containing a preamble code unique to the block marker, section C containing the block number and section D containing a postamble code.

In either the writing or rewriting of data in a predetermined block, the block marker is read to ascertain that the correct block follows. The read/write data control circuit is then switched to the write mode and sections F, G and H are written in the block. Sections F and H represent single bytes of data which may constitute predetermined codes, section G representing a plurality of bytes disposed therebetween. In accordance with the operation of the system of the present invention, the block of data, i.e. sections F, G and H, is separated from section D of the block marker by a section E of erased tape referred to herein as the sync gap. Since the system of the present invention employs phase encoded recording, it is necessary that section E be erased to permit synchronization of the decoder after the block marker has been read in preparation for reading the block. In the preferred embodiment described herein, section E is one byte time in length.

The sync gap is timed by a circuit which is illustrated in block diagram form in FIG. 2 wherein some of the interblock connections of secondary importance to the understanding of the present invention have been omitted for the sake of clarity. Phase encoder 11 and phase decoder 12 are connected to a read/write head 13 that is operatively associated with magnetic medium 10. A data source and sink such as computer 14 supplies the phase encoder with data to be written by head 13 on magnetic medium 10, and it receives data from head 13 after it has been decoded by phase decoder 12. The WRITE-signal provided by computer 14 defines the mode of operation of the data control circuit of this invention, which comprises circuits 15 through 19. The WRITE-signal starts write clock 15. The resultant WRITE CLOCK-signal provides the timing signal for phase encoder 11, this signal also being applied to write bit counter 16 and to data converter 17. Block 17 is separated by a dashed line into two sections labeled WRITE and READ, since the circuitry represented by block 17 provides a dual function. In the write mode, converter 17 functions as a parallel-to-serial converter, whereas it functions as a serial-to-parallel converter in the read mode. Write clock 15 responds to the WRITE-signal via write bit counter 16 back to computer 14 by the REQUEST NEXT DATA-signal which informs computer 14 that the character which had been previously transferred into a first slot of converter 17 has transferred to a second slot thereof and is being written and that another character is needed.

The WRITE-signal is also connected to erase latch 18 which is activated only by the ongoing transition of the WRITE-signal. The resultant ERASE-signal from erase latch 18 causes erasure of the magnetic medium. An ERASE BIT-signal from the computer is also capable of setting erase latch 18. During the writing of data, computer 14 supplies data in parallel over the write data bits line to converter 17 which transmits the data in serial form to phase encoder 11 over the write data line. During those times that a byte comprising all zeros is made available by computer 14 for writing on tape 10, the ERASE BIT-signal is also provided by computer 14 to insure that the byte written is erased tape. Thus, the computer supplies data over the write data bits line or it provides an ERASE BIT-signal depending upon whether the program is specifying the writing of data or the erasure of tape.

When data is being written, the WRITE CLOCK-signal provides the timing for the WRITE DATA-signal supplied to encoder 11 by converter 17. The DATA STROBE-signal from computer 14 causes the data available on the write data bits line to be transferred into converter 17. The INITIALIZE-signal from computer 14 resets circuitry associated with the write bit counter 16 as well as the read bit counter 19.

During the read mode, data is read by head 13, and the resultant signal is coupled to phase decoder 12. The decoder provides the READ DATA-signal, the READ CLOCK-signal and the GAP DETECT-signal. This latter mentioned signal resets bit counter 19. The first bit received after the gap is taken to be the first bit of a byte. The READ CLOCK-signal clocks the READ DATA-signal into converter 17, which functions during the read mode as a serial-to-parallel converter. Serial data from phase decoder 12 is stored in a first slot of converter 17 and transferred to a second slot therein after an entire byte has been transferred. Bit counter 19 counts read clock pulses and provides a DATA READY-signal at the end of a byte, thus informing computer 14 that the data is ready for transfer from converter 17. The bits are then transferred in parallel over the read data bits line to computer 14 upon transmission of the DATA READY-signal.

The detailed circuit illustrated in FIGS. 4–6 will be described in connection with a specific example depicted by the waveforms of FIGS. 7 and 8. The duration of the waveforms of FIG. 7 is 7 byte times, and each byte time is subdivided into eight 64 μs bit times, bits 1 and 8 being numbered. During each byte time of a write mode the computer makes available to the data control circuit parallel data which is to be written during the next byte time. For the purposes of the present discussion, it will be assumed that the binary numbers made available by the computer during byte times 3, 4, 6 and 7 is 00000000, and those made available during byte times 1, 2 and 5 are 00110010, 00111000 and 11111111, respectively.

Figure 5:
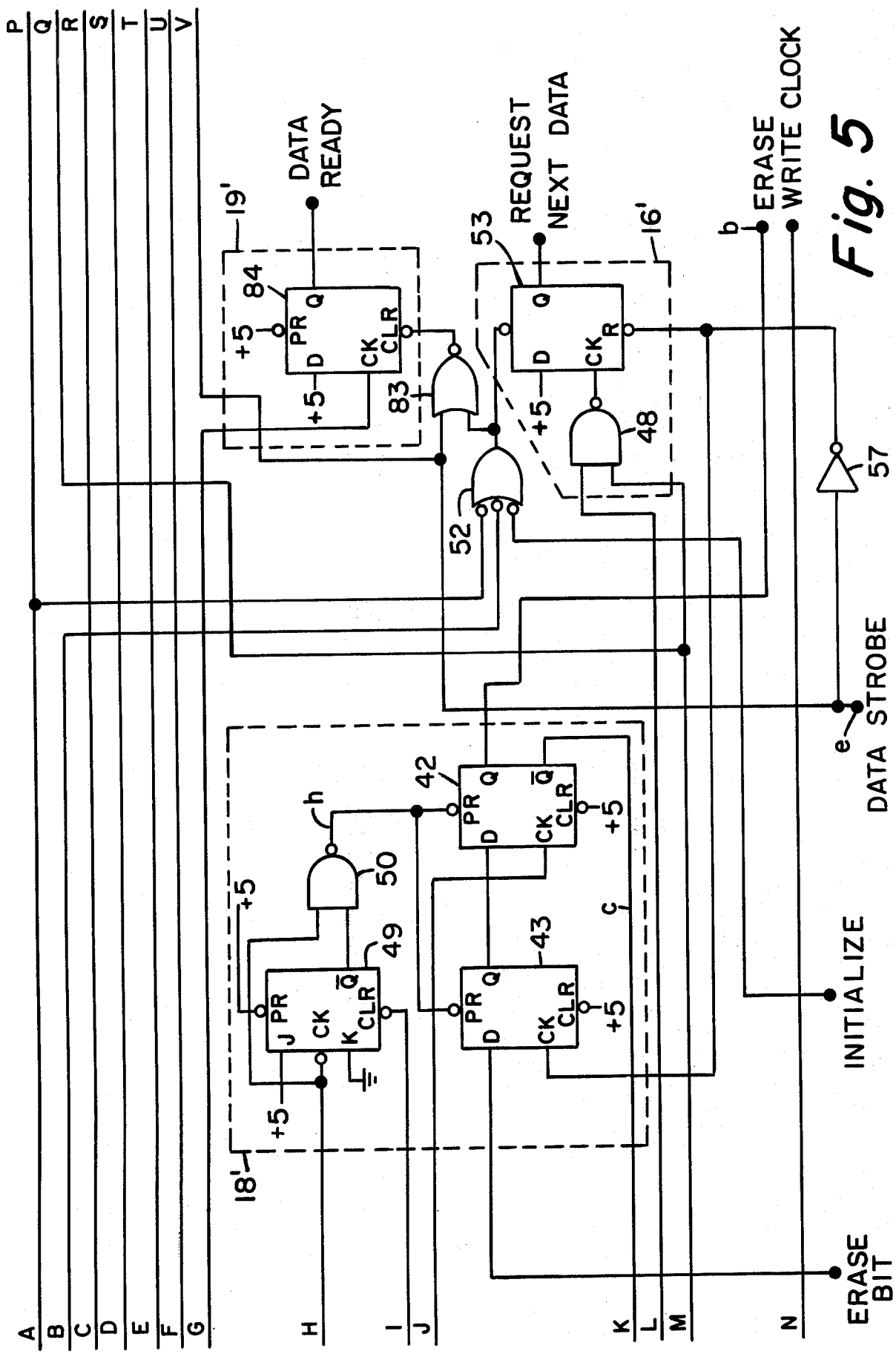
Figure 6:
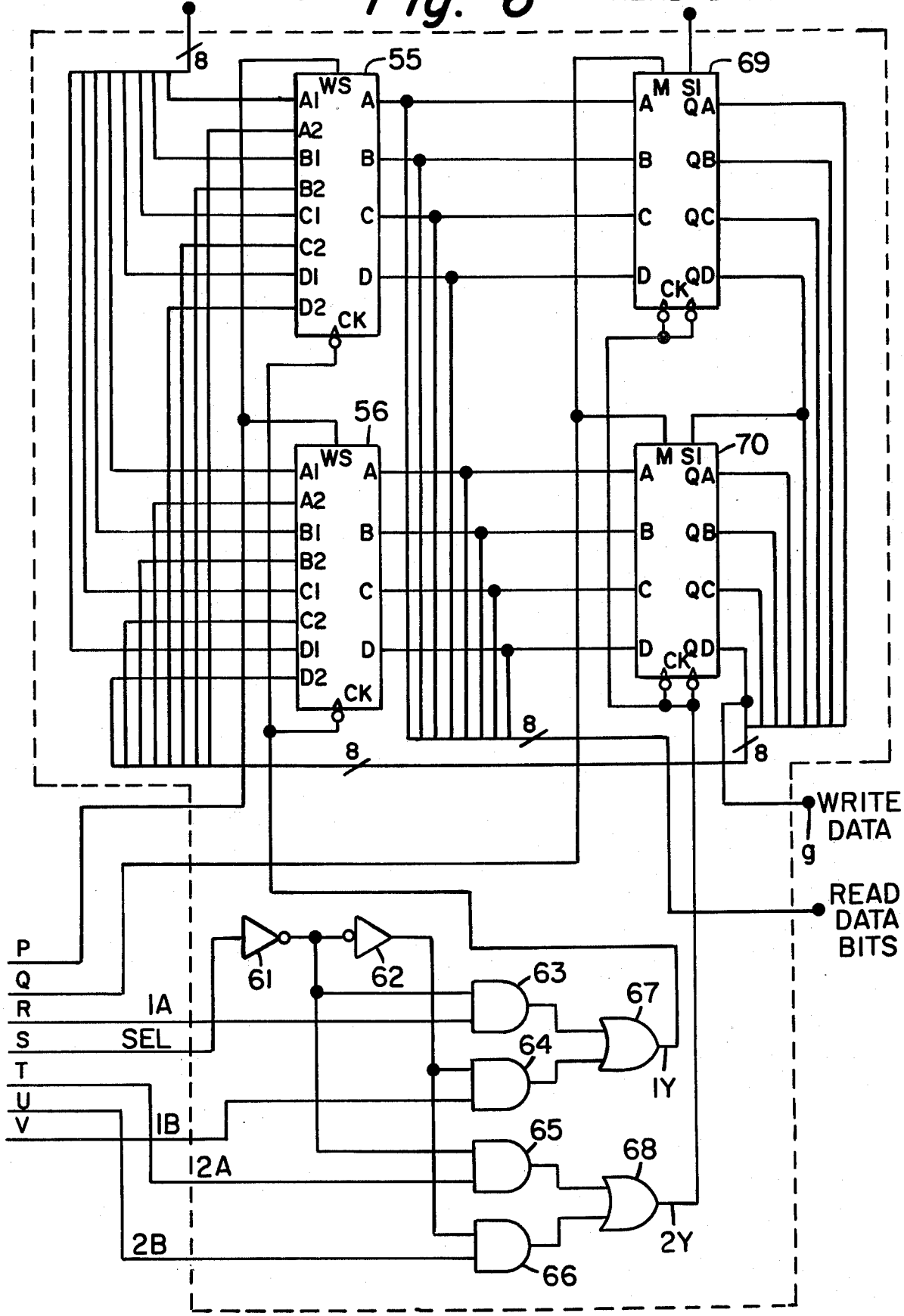

In FIGS. 4–6, the circuits which comprise the data control circuit of FIG. 2, are represented by primed reference numerals 15' through 19'. It is noted that portions of write bit counter 16' and read bit counter 19' appear on both FIGS. 4 and 5.

Write clock 15' comprises a clock or pulse generator 31, the output of which is high for 0.25 μs and low for 0.25 μs for the data rate of the present example. The output of pulse generator 31 is coupled to counter 77 of the read bit counter 19' and to counter 32 of the write clock. Write clock 15' determines all of the timing for the data control circuit during the write mode. Circuits 32 and 36 are down counters which reduce the frequency of the signal at the input thereof, counter 32 reducing the frequency of pulse generator 31. The signal appearing at the output of gate 38 is a pulse train having the frequency of the WRITE CLOCK-signal. This signal is connected to the input INB of counter 44 of write bit counter 16'. Gate 45, which is connected to the output of counter 44, detects the 8th bit, and the output thereof is coupled by inverter 46 to various circuits including gates 33 and 48 and shift registers 49 and 50 to set these circuits up at the beginning of a byte time. Write bit counter 16', the function of which is to count the WRITE CLOCK-signal into bytes, provides an output signal which is connected to gate 48 for the purpose of initiating the request for data from the computer. Referring to line d FIG. 7, it can be seen that at the beginning of each byte time, the REQUEST NEXT DATA-signal is turned on. The WRITE CLOCK-signal shown in line f of FIG. 7 appears at the output of amplifier 40.

To switch the data control circuit to the write mode the WRITE-signal goes high as illustrated in line a of FIG. 7. The data control circuit functions in the following manner to insure that the first byte written by head 13 is erased tape. The WRITE-signal is connected to the CLR input of flip-flop 49. At the end of a write mode the write signal goes low and presets flip-flop 49 which is held cleared while the data control circuit is in the read mode. At the beginning of a write mode, the WRITE-signal is inverted by amplifier 51, the output of which is connected to inputs R01 and R02 of counter 32. Therefore, 4μs after the WRITE-signal goes high, square wave pulses of 4μs duration begin appearing at output D of counter 32. These pulses are applied to flip-flop 49 and gate 50, and the first pulse of this pulse group causes an output from terminal Q̄ of flip-flop 49, thereby causing the transmission of a negative pulse from the output of gate 50. The first pulse received by flip-flop 49 changes the state thereof, and the Q̄ output goes low, thus precluding the generation by gate 50 of further negative pulses during that write mode. The detailed timing of this operation is illustrated in FIG. 7A. The negative pulse from gate 50 presets flip-flops 42 and 43. When input terminal PR of flip-flop 42 is pulsed negatively, the Q output thereof goes high. Since the ERASE-signal is derived at this output, erasure of tape occurs during the first byte time of each write mode.

The REQUEST NEXT DATA-signal is set up in the following manner. The output of inverter 51 is connected to gate 52, the output of which is connected to the PR input of flip-flop 53. The Q output terminal of flip-flop 53, which is the REQUEST NEXT DATA-signal, must instruct the computer to transmit the data to be written during byte time 2 since byte 1 is being written, byte 1 being erased tape. In response, the computer places the binary signal 00110010 on the write data bits lines and also sets the ERASE BIT-signal at its proper level, which in this case is low since data is to be written during byte time 2. Thus, the signal coupled to input D of flip-flop 43 is low and the binary signal 00110010 is transferred into terminals A1, B1, C1 and D1 of data register circuits 55 and 56. The least significant bit is transferred into input D1 of circuit 56 and the most significant bit is coupled into input terminal A1 of circuit 55. At the proper time, the determination of which will be described hereinbelow, the data is transferred from outputs A through D of data register circuits 55 and 56 to inputs A through D of registers 49 and 50, respectively. Essentially, circuits 55 and 56 are latches where the data is stored, and circuits 49 and 50 comprise the working register. The data is shifted from terminal QD of register 50 in serial form as the WRITE DATA-signal.

At the beginning of the next byte the erase bit is transferred from flip-flop 43 to the D input of flip-flop 42, thereby setting up the erase line in the proper mode. For byte 2, the erase bit transmitted to flip-flop 43 is low, and it is transferred to flip-flop 42 as a low. Therefore, the Q output of flip-flop 42 is low during byte time 2 causing the ERASE-signal to be low as shown in line b of FIG. 7. The WRITE ENABLE-signal, which appears at the Q output of flip-flop 42 is high during byte time 2 as shown in line c of FIG. 7, thereby enabling gate 39 to pass the WRITE CLOCK-signal shown in FIG. 7, line *f*.

The data which had been transferred into data latch circuits 55 and 56 is transferred to shift registers 49 and 50 at the beginning of byte time 2. One bit time after the data to be written during byte time 2 has been transferred, output QD of register 50 goes positive just as the WRITE CLOCK-signal at the output of amplifier 40 falls to its low level as illustrated in FIG. 7D. The WRITE CLOCK-signal thus rises and falls slightly before the next bit is transferred out of register 50. The data is shifted down one position in registers 49 and 50 at each write clock pulse. The signal level, which had appeared at output QC of register 50, for example, now appears at output QD of that register. This shift occurs throughout registers 49 and 50, and therefore the data is written least significant bit first on tape.

As soon as the data is transferred over from data registers 55,56 to shift register 49,50, and the erase bit is transferred over to flip-flop 42, the request next data line is immediately set by the output of amplifier 46 which is coupled by gate 48 to flip-flop 53. Thus, while data is being shifted out of registers 49, 50, the computer makes available the next WRITE DATA BITS-signal, and the appropriate erase bit level, and that data is shifted into data register 55, 56 by the DATA STROBE-signal illustrated in line e of FIGS. 7 and 7B. The DATA STROBE-signal is also coupled by inverter 57 and gate 83 for the purpose of clearing flip-flops 53 and 84.

As indicated hereinabove, the binary signal 00111000 is to be written during byte time 3, and the ERASE BIT-signal coupled into flip-flop 43 during byte time 2 is therefore low. This data is shifted into data register 55, 56 by the DATA STROBE-signal occurring during bit time 2 of byte time 2, is transferred to registers 49, 50 at the beginning of byte time 3, and will be written on tape.

Since tape is to be erased during byte time 4, the erase bit line goes high, thereby transmitting an erase bit to terminal D of flip-flop 43. At the beginning of byte time 4, this bit is shifted over to flip-flop 42 by circuits 33 and 34. Therefore, the Q output of flip-flop 42 is high during byte time 4 causing erasure of tape during that byte time. The circuit functions in a similar manner during byte time 5 since the previously mentioned program also calls for erased tape during that byte time. During byte time 5 all ones are transferred into data register 55, 56 in preparation for the writing of that data during byte time 6.

As stated hereinabove, circuits 49, 50, 55 and 56 of register 17' are dual function circuits in that they function during the read mode and the write mode. In the write mode, data is shifted into data registers 55 and 56 and is then transferred over to registers 49 and 50 from which it is shifted out in serial form. In the read mode, data is shifted into input SI of register 49 and is shifted down through registers 49 and 50. When an entire byte of data is available, it is transferred to data register 55, 56 where it is stored until transferred to the computer over the read data bits line.

Register 17' includes a mode selector circuit comprising amplifiers 61 and 62 and gates 63 through 68 for connecting the appropriate signals to the CK inputs of data registers 55 and 56 and shift registers 49 and 50, depending upon whether the data control circuit is in the read mode or the write mode. The mode selector circuit may consist of a portion of a quadruple two-line to one-line data selector/multiplexor type SN 74157 manufactured by Texas Instruments, Inc. The WRITE-signal is connected to the select input terminal SEL. Thus, during the read mode, input terminals 1A and 2A are connected to output terminals 1Y and 2Y, respectively. During the write mode, input terminals 1B and 2B are respectively connected to output terminals 1Y and 2Y.

A pulse is generated at the output of gate 75 when 8 bits of the READ DATA-signal have shifted into registers 49, 50. Between the last read clock of one byte and the first read clock of the next byte the data must be transferred from registers 49, 50 to registers 55, 56. This function is performed in the following manner. A pulse is produced at the output of gate 79 after every read clock. Circuits 72, 73 and 74 count every 8th read clock. The outputs from gates 74 and 79 are coupled to gate 75 which produces a pulse after every 8th read clock, as illustrated in line k of FIG. 8A. This pulse is connected from gate 75 to input terminal 1A of the mode selector circuit. During the read mode, it is therefore connected to terminals CK registers 55, 56 to cause data to be transferred to those registers from shift registers 49, 50.

The DATA STROBE-signal is connected to input terminal 1B of the mode selector circuit. During the write mode, this pulse causes data to be accepted by terminals A1 through D1 of registers 55, 56 from the computer over the write data bits line. The selection of the source of that data is performed by registers 55, 56, since the inverted WRITE-signal is connected to the WS input terminals of those registers. This input causes registers 55, 56 to select either the WRITE DATA BITS-signal which is coupled to input A1 through D1 of registers 55, 56 during the write mode or to select the data from the output terminals of shift registers 49, 50, which appears at input terminals A2 through D2 of data registers 55, 56 during the read mode. This selection process provides the circuitry 49, 50, 55 and 56 with the aforementioned dual function capability.

The READ CLOCK-signal is connected to input terminal 2A of the mode selector circuit. The WRITE CLOCK-signal, which appears at the output of amplifier 40, is connected to input terminal 2B. In the read mode, the read clock is therefore connected via output terminal 2Y to the clock terminals CK of shift registers 49, 50 to shift the READ DATA-signal into the terminal SI of shift register 49, the serial data being shifted down through shift registers 49 and 50 until an entire byte is contained therein. Similarly, in the write mode, the WRITE CLOCK-signal is coupled to the CK inputs of shift registers 49 and 50 to shift out the WRITE DATA-signal.

The READ CLOCK-signal, which is shown in line *r* of FIG. 8, is coupled to a group of circuits in read bit counter 19' including counter 77, flip-flop 78, gate 79 and amplifiers 80 and 81. This portion of the read bit counter functions to produce a pulse which can cause the DATA READY-signal to go high and which can transfer the data. The pulse which apears at the output of gate 79 is coupled by gate 75 and converter 76 to the CK input terminal of flip-flop 84. As stated previously, the read clock pulses are counted by counter 73, and gate 74 detects the 8th bit. During the 8th bit, gate 75 enables the READ CLOCK-signal appearing at the output of gate 79 to cause, via amplifier 76, the DATA READY-signal to be activated.

In a gap detect situation, the GAP DETECT-signal is coupled by gates 71 and 72 to input terminals R01 and R02 to thereby reset the read bit counter. After cessation of the gap, the read clock starts running. Eight bits are counted, indicating that 8 data bits have been clocked in and shifted down through shift registers 49, 50, and in the aforementioned manner the pulse is produced which transfers those 8 bits over to circuits 55, 56. The pulse also sets the data ready flip-flop 84 to signal the computer that the data is ready to be transferred from circuits 55, 56 as parallel data over the read data bits lines.

I claim:
1. In a system for storing digital data on a magnetic medium comprising
    read-write means for writing data on said medium and for reading data from said medium,
    a phase encoder for receiving binary coded digital data and providing said read-write means with a phase encoded signal, said phase encoder having an erase input terminal for receiving an erase signal which causes said read-write means to erase said magnetic medium,
    a phase decoder for receiving a phase encoded signal from said read-write means and providing a binary coded digital signal,
    a data source and sink for providing write data bits which are to be written on said magnetic medium and for providing a write-signal which signifies the beginning of a write mode, and
    a data control circuit for transferring said write data bits to said phase encoder and for transferring said read data from said phase decoder to said data source and sink,
said data control circuit being characterized in that it comprises
    an erase latch having an output terminal connected to the erase terminal of said phase encoder and an input terminal for receiving said write-signal from said data source and sink, said erase latch providing said phase encoder with an erase signal which causes erasure of said magnetic medium for a predetermined period of time following the ongoing transition of said write-signal.

2. The system of claim 1 further comprising means for generating a WRITE CLOCK-signal which is connected to said phase encoder for providing the timing therein, said WRITE-signal being coupled to said WRITE CLOCK-signal generating means for initiating the operation thereof.

3. The system of claim 2 wherein said data source and sink also supplies an ERASE BIT-signal to said erase latch, resulting in the erasure of data from said magnetic medium for said predetermined period of time.

* * * * *